(12) United States Patent
Ganda et al.

(10) Patent No.: US 10,104,123 B2
(45) Date of Patent: Oct. 16, 2018

(54) FETCHING A POLICY DEFINITION LIBRARY FROM A POLICY SERVER AT MOBILE DEVICE RUNTIME OF AN APPLICATION PACKAGE TO CONTROL ACCESS TO MOBILE DEVICE RESOURCES

(71) Applicant: CA, INC., New York, NY (US)

(72) Inventors: Madhusudhan Ganda, Kadapa (IN); Vikrant Nandakumar, Thanisandra (IN); Vardhineedi Satyanarayana Murthy, Mamidikuduru Mandal (IN); Hemanth Kumar Pinninti, Bobbili (IN)

(73) Assignee: CA, INC., New York, NY (US)

( * ) Notice: Subject to any disclaimer, the term of this patent is extended or adjusted under 35 U.S.C. 154(b) by 322 days.

(21) Appl. No.: 14/863,105

(22) Filed: Sep. 23, 2015

(65) Prior Publication Data
US 2017/0085591 A1  Mar. 23, 2017

(51) Int. Cl.
| H04L 29/06 | (2006.01) |
| H04W 12/08 | (2009.01) |
| G06F 21/62 | (2013.01) |

(52) U.S. Cl.
CPC ............ H04L 63/20 (2013.01); G06F 21/629 (2013.01); G06F 21/6281 (2013.01); H04W 12/08 (2013.01)

(58) Field of Classification Search
CPC ..... H04L 63/20; H04L 29/06; G06F 21/6281; G06F 21/629; G06F 21/62; H04W 12/08
See application file for complete search history.

(56) References Cited

U.S. PATENT DOCUMENTS

| 7,945,902 | B1 * | 5/2011 | Sahoo | G06F 9/44589 714/48 |
| 8,892,876 | B1 * | 11/2014 | Huang | G06F 21/6209 713/165 |
| 9,736,540 | B2 * | 8/2017 | Anderson | H04N 21/47205 |
| 2004/0054791 | A1 * | 3/2004 | Chakraborty | H04L 63/20 709/229 |
| 2006/0005205 | A1 * | 1/2006 | Illowsky | G06F 1/3203 719/315 |
| 2006/0059099 | A1 * | 3/2006 | Ronning | G06F 21/10 705/59 |

(Continued)

Primary Examiner — Luu T Pham
Assistant Examiner — James J Wilcox
(74) Attorney, Agent, or Firm — Sage Patent Group

(57) ABSTRACT

A mobile device fetches a policy definition library from a policy server responsive to occurrence of a defined event associated with an application package. The policy definition library contains policies defining resources of the mobile device that the application package is permitted to access. The mobile device executes the wrapped application package containing application executable code and application wrapper executable code that is called by each execution of an agnostic wrapper function residing at each of a plurality of locations in the application executable code. Responsive to execution of the agnostic wrapper function at any of the plurality of locations in the application executable code, the mobile device executes the application wrapper executable code to control whether access by the application executable code is granted to resources of the mobile device based on the policies contained in the policy definition library.

13 Claims, 9 Drawing Sheets

(56) References Cited

U.S. PATENT DOCUMENTS

| | | | |
|---|---|---|---|
| 2006/0059561 A1* | 3/2006 | Ronning | G06F 21/10 726/26 |
| 2006/0070028 A1* | 3/2006 | Belov | G06F 9/4484 717/114 |
| 2008/0127294 A1* | 5/2008 | Keith | H04L 63/20 726/1 |
| 2009/0031418 A1* | 1/2009 | Matsuda | G06F 12/1483 726/21 |
| 2009/0063502 A1* | 3/2009 | Coimbatore | G06F 17/30893 |
| 2009/0089379 A1* | 4/2009 | Pegg | G06F 9/54 709/206 |
| 2010/0064233 A1* | 3/2010 | Dewar | G06F 17/3089 715/760 |
| 2010/0093273 A1* | 4/2010 | Hohl | H04M 1/72522 455/7 |
| 2010/0146269 A1* | 6/2010 | Baskaran | G06F 21/10 713/165 |
| 2012/0117234 A1* | 5/2012 | Miryanov | G06F 8/60 709/224 |
| 2012/0216241 A1* | 8/2012 | Alon | H04L 63/20 726/1 |
| 2013/0067563 A1* | 3/2013 | Park | G06F 21/53 726/17 |
| 2013/0276002 A1* | 10/2013 | Dalcher | G06F 9/541 719/328 |
| 2014/0032691 A1* | 1/2014 | Barton | H04L 41/00 709/206 |
| 2014/0032759 A1* | 1/2014 | Barton | H04L 67/10 709/225 |
| 2014/0040979 A1* | 2/2014 | Barton | H04L 63/20 726/1 |
| 2014/0090071 A1* | 3/2014 | Salehie | G06F 21/50 726/25 |
| 2014/0109072 A1* | 4/2014 | Lang | G06F 8/52 717/168 |
| 2014/0113593 A1* | 4/2014 | Zhou | H04L 63/20 455/411 |
| 2014/0304782 A1* | 10/2014 | Razzaq | G06F 21/335 726/4 |
| 2015/0026483 A1* | 1/2015 | Jiang | G06F 21/12 713/190 |
| 2015/0067868 A1* | 3/2015 | Kim | G06F 21/577 726/25 |
| 2015/0156091 A1* | 6/2015 | Miryanov | G06F 8/60 709/224 |
| 2015/0207802 A1* | 7/2015 | Balasubramaniam | H04L 63/08 726/30 |
| 2015/0350737 A1* | 12/2015 | Anderson | H04N 21/47205 348/564 |
| 2015/0358355 A1* | 12/2015 | Bartholomay | H04L 63/0227 726/1 |
| 2015/0378881 A1* | 12/2015 | Vaidyanath | G06F 11/3688 717/124 |
| 2016/0070765 A1* | 3/2016 | Louvau | G06F 17/30424 717/120 |
| 2016/0072844 A1* | 3/2016 | Porras | G06F 21/53 726/1 |
| 2016/0099972 A1* | 4/2016 | Qureshi | H04L 63/20 726/1 |
| 2016/0234250 A1* | 8/2016 | Ashley | H04L 63/105 |
| 2016/0246992 A1* | 8/2016 | Brutschy | G06F 21/6245 |
| 2016/0283207 A1* | 9/2016 | Nandakumar | G06F 8/41 |
| 2016/0291952 A1* | 10/2016 | Velasco | G06F 8/61 |
| 2016/0291955 A1* | 10/2016 | Axtell | G06F 8/65 |
| 2016/0378447 A1* | 12/2016 | Nandakumar | G06F 8/53 717/108 |
| 2016/0378578 A1* | 12/2016 | Nandakumar | G06F 9/44505 719/328 |
| 2017/0010952 A1* | 1/2017 | Nandakumar | G06F 11/3612 |
| 2017/0039130 A1* | 2/2017 | Nandakumar | G06F 11/3688 |
| 2017/0060653 A1* | 3/2017 | Nandakumar | G06F 11/079 |
| 2017/0060654 A1* | 3/2017 | Nandakumar | G06F 11/079 |
| 2017/0093877 A1* | 3/2017 | Ganda | H04L 63/105 |
| 2017/0102976 A1* | 4/2017 | Nandakumar | G06F 8/60 |
| 2017/0118233 A1* | 4/2017 | Abdulhayoglu | G06F 21/53 |
| 2017/0206123 A1* | 7/2017 | Kirkpatrick | G06F 8/61 |
| 2017/0222977 A1* | 8/2017 | Newell | H04L 63/0272 |
| 2017/0286075 A1* | 10/2017 | Kaipu | G06F 8/41 |
| 2017/0302619 A1* | 10/2017 | Porika | H04L 61/203 |
| 2017/0347283 A1* | 11/2017 | Kodaypak | H04W 4/70 |
| 2018/0025157 A1* | 1/2018 | Titonis | G06F 21/56 726/24 |
| 2018/0026943 A1* | 1/2018 | Call | H04L 63/02 726/11 |
| 2018/0131722 A1* | 5/2018 | Burrell | H04L 63/20 |
| 2018/0198874 A1* | 7/2018 | Diem | G06Q 10/00 |
| 2018/0212997 A1* | 7/2018 | Ahuja | H04L 63/20 |

* cited by examiner

FETCHING A POLICY DEFINITION LIBRARY FROM A POLICY SERVER AT MOBILE DEVICE RUNTIME OF AN APPLICATION PACKAGE TO CONTROL ACCESS TO MOBILE DEVICE RESOURCES

BACKGROUND

The present disclosure relates to controlling communications between applications and resources of a mobile device.

Applications developed for mobile devices are distributed in an application package containing the elements needed to run the application, such as the program code, resources, certificates and a manifest. In some cases, it is desirable for an entity such as an application designer, application owner, or enterprise administrator to exercise control over the operation of an application after deployment to mobile devices. For example, it may be desirable to provide security policies that control what mobile device resources the application can access.

To accomplish this, the program code of the application may be modified to include code that performs or links to monitoring and control functions. This modification is referred to as "application wrapping." When an application is wrapped, a layer of code is added to the application executable code to add features or modify behavior of the application without making changes to the application operational functionality. The addition of wrapping code may reduce the risk to an enterprise of improper or unauthorized use of an application. For example, wrapping can add security and management features to an application before it is deployed across mobile devices of an enterprise.

SUMMARY

Some embodiments of the present disclosure are directed to a method of performing operations on a processor of a mobile device. Responsive to occurrence of a defined event associated with an application package, the operations fetch a policy definition library from a policy server through a data network. The policy definition library contains policies defining resources of the mobile device that the application package is permitted to access. The operations execute the wrapped application package containing application executable code and application wrapper executable code that is called by each execution of an agnostic wrapper function residing at each of a plurality of locations in the application executable code. Responsive to execution of the agnostic wrapper function at any of the plurality of locations in the application executable code, the application wrapper executable code is executed to control whether access by the application executable code is granted to resources of the mobile device based on the policies contained in the policy definition library.

Some other embodiments of the present disclosure are directed to a method of performing operations on a processor of a policy server. The operations include receiving a request message through a data network from a mobile device. The request message contains an identifier of an application package on the mobile device and requests delivery of one of a plurality of policy definition libraries accessible through the policy server that is associated with the identifier of the application package. The operations further include fetching the one of the plurality of policy definition libraries based on the identifier of the application package, and communicating the one of the plurality of policy definition libraries to the mobile device via the data network.

Some other embodiments of the present disclosure are directed to a mobile device that includes a processor in a memory coupled to the processor and storing computer readable program code that when executed by the processor causes the processor to perform operations. The operations include, responsive to occurrence of a defined event associated with an application package, fetching a policy definition library from a policy server through a data network. The policy definition library contains policies defining resources of the mobile device that the application package is permitted to access. The operations further include: executing the wrapped application package containing application executable code and application wrapper executable code that is called by each execution of an agnostic wrapper function residing at each of a plurality of locations in the application executable code; and responsive to execution of the agnostic wrapper function at any of the plurality of locations in the application executable code, executing the application wrapper executable code to control whether access by the application executable code is granted to resources of the mobile device based on the policies contained in the policy definition library.

Other methods, mobile devices, and policy servers according to embodiments of the present disclosure will be or become apparent to one with skill in the art upon review of the following drawings and detailed description. It is intended that all such methods, mobile devices, and policy servers be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
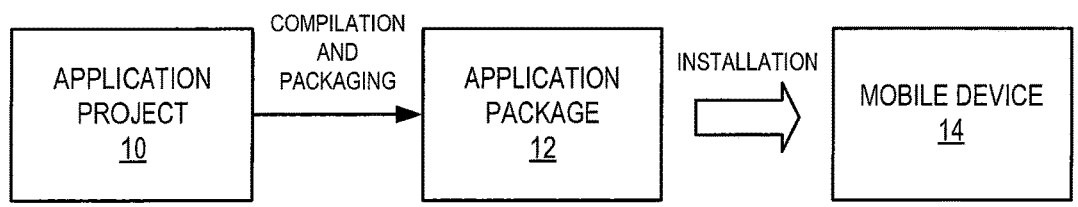
FIG. 1 is a block diagram illustrating the packaging and installation of an application on a mobile device.

FIG. 1 shows example development flow for an application developed using the Android operating system and distributed in a package file, such as an Android Package File, for installation on a mobile device 14. An application project 10 includes various files needed to build an application, including source code, libraries, resources, and certificates. The source code is compiled into binary executable code that is packaged along with the associated resources and manifest into an application package 12.

An application is typically written in a high level programming language, such as Java. During compilation and packaging, the source code may be first compiled into a binary format and then converted into a format appropriate for the operating system on which the application is to be used. For example, for a Java application running on an Android platform, the source code is first compiled into class files in the Java bytecode format, which are then converted into ".dex" files in the Dalvik bytecode. The Dalvik bytecode is the native format of the Android operating system.

The application package 12, such as an Android Package in the ".apk" format, is then generated including the binary program code in ".dex" files, along with associated resources and a manifest file. During installation onto the mobile device 14, the operating system of the mobile device 14 reads the manifest file and unpacks and installs the program code and associated resources from the .apk file on the mobile device 14. The mobile device 14 may be an end-user device such as a smart phone, tablet computer, laptop computer, desktop computer, gaming console, appliance terminal (e.g., thermostat), etc.

Figure 2:
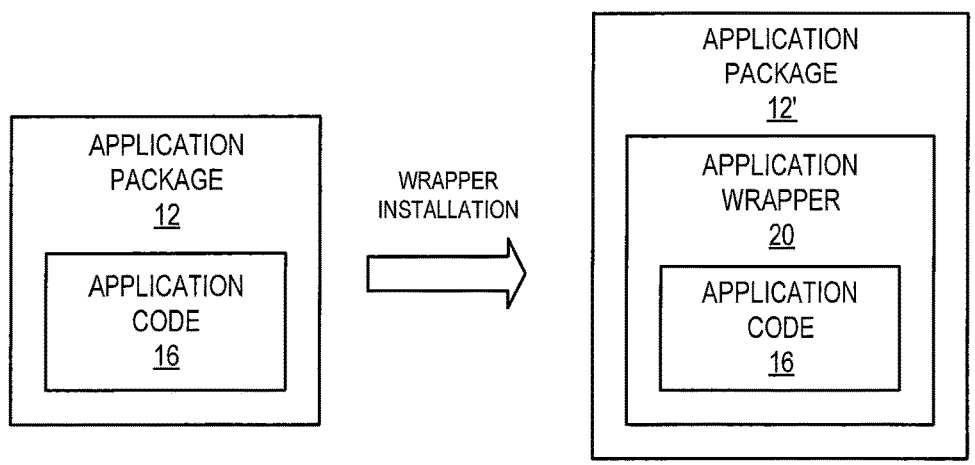
FIG. 2 is a block diagram illustrating installation of an application wrapper that encapsulates application code.

Installation of an application wrapper is illustrated in FIG. 2. As shown therein, before wrapping, an application package 12 includes application code 16. A modified application package 12' is generated that includes the application wrapper 20 installed "around" to encapsulate the application code 16. The application code 16 is typically modified to include hooks (program code) that facilitate integration with the application wrapper 20. When the application package 12' is installed on a device, the operating system installs the application code 16 wrapped by the application wrapper 20 onto the mobile device 14.

Figure 3:
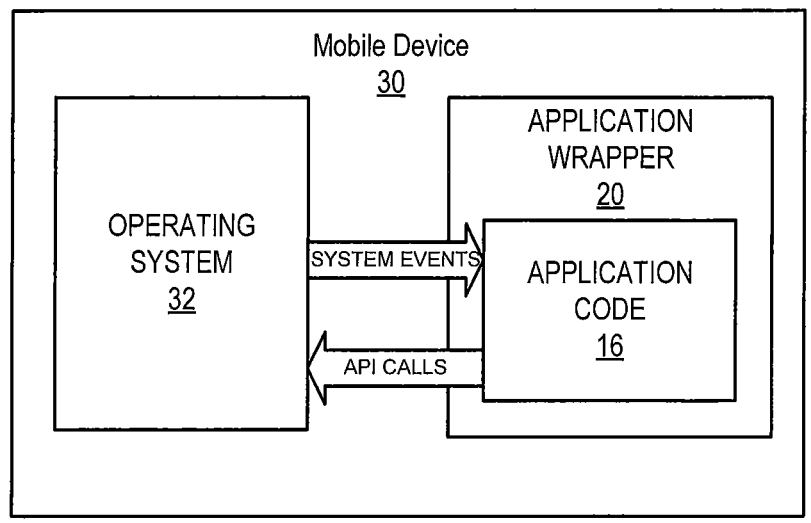
FIGS. 3 and 4 are block diagrams illustrating operation of an application wrapper encapsulating application code.

FIG. 3 illustrates operation of the application wrapper 20 encapsulating the application code 16 on a mobile device 30 which includes an operating system 32. The operating system 32 notifies the application code 16 of system events associated with the application. A system event is an action of the system that must be handled by the program, such as "launch app", "OnStart", "OnStop", etc. For example, the operating system 32 may generate a "launch app" event in response to a user tapping on an app in the user interface of the device 30. System events are processed by a listener function in the application code 16. When an application wrapper 20 is installed, however, the application wrapper 20 may intercept system events and determine if an action should be taken in response to the system event. For example, the application wrapper 20 may record the system event, generate a notification in response to the system event, etc.

The logic of the application wrapper 20 may also determine whether or not the system event should be passed along to the application code 16. Accordingly, the application wrapper 20 may implement logic that listens for system events provided to the application code 16. Note that the listener function of the application code 16 may be left in place to process system events that are passed through to the application code 16 by the application wrapper 20.

For example, the operating system 32 may generate an "onResume" event which is intercepted by the application wrapper 20. If the logic in the application wrapper 20 determines that the application 16 is not authorized to resume, then the application wrapper 20 blocks the event by not forwarding it to the listener function in the application code 16.

The application wrapper 20 may also intercept application programming interface (API) calls made by the application code 16 to the operating system (OS) 32, also referred to as OS API calls or API calls. The application code 16 issues an OS API call to request access to a resource of the mobile device 30, such as to a camera resource, a sound recorder resource, a location services resource, and/or a contact information repository resource. For example, an OS API call may be used to read and/or record data from a camera and a microphone.

The application wrapper 20 may pass the OS API call along to the operating system 32. Before the OS API call is passed to the operating system 32, the logic of the application wrapper 20 determines if any action needs to be taken in response to the OS API call and may also determine whether or not to pass the OS API call along to the operating system 32.

In general, the application wrapper 20 includes executable code that monitors and/or controls behavior of the application code 16 by intercepting one or more OS API calls by the application code 16, executes monitoring and/or control code in response to the OS API call, and thereafter returns control to the application code 16 and/or passes the OS API call to the operating system 32 for processing.

For example, in case the application wrapper 20 is designed to limit access to a feature or resource on the device 30 during a designate time frame the application wrapper 20 may intercept an OS API call from the application code 16 that invokes the feature and, if the OS API call is made outside the designated time frame, generate and return an error code to the application code 16 instead of passing the OS API call on to the operating system 32.

Figure 4:
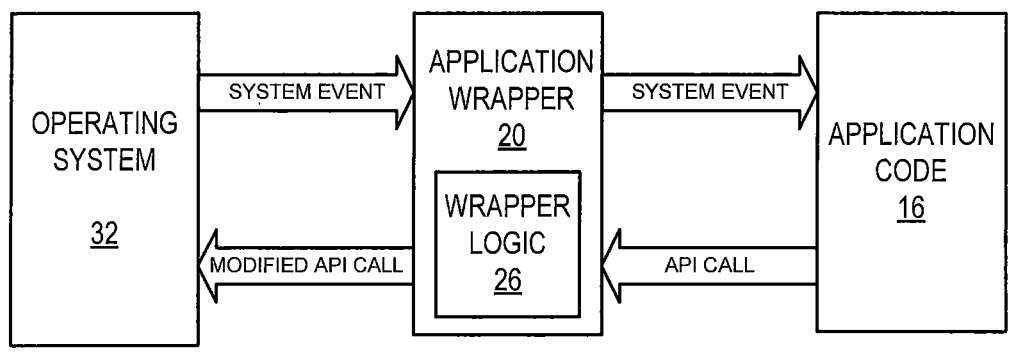

FIG. 4 illustrates the relationship between the operating system 32, the application wrapper 20 and the application code 16 in more detail. In particular, the application wrapper 20 includes wrapper logic 26 that determines how intercepted system events and OS API calls are processed by the application wrapper 20.

As shown in FIG. 4, the application wrapper 20 intervenes between the operating system 32 and the application code 16 and filters and/or operates on system events and OS API calls passing between the operating system 32 and the application code 16. When a system event is generated and sent to the application code 16 by the operating system 20, a first listener function in the application wrapper 20 intercepts the system event and passes it to the wrapper logic 26. The wrapper logic 26 determines how to respond to the system event and whether or not to pass the system event along to the application code 16.

A second listener function in the application wrapper 20 listens for OS API calls from the application code 16, and passes the OS API calls to the wrapper logic 26. The wrapper logic 26 determines whether or not to pass the API call along to the operating system 32.

Figure 5:
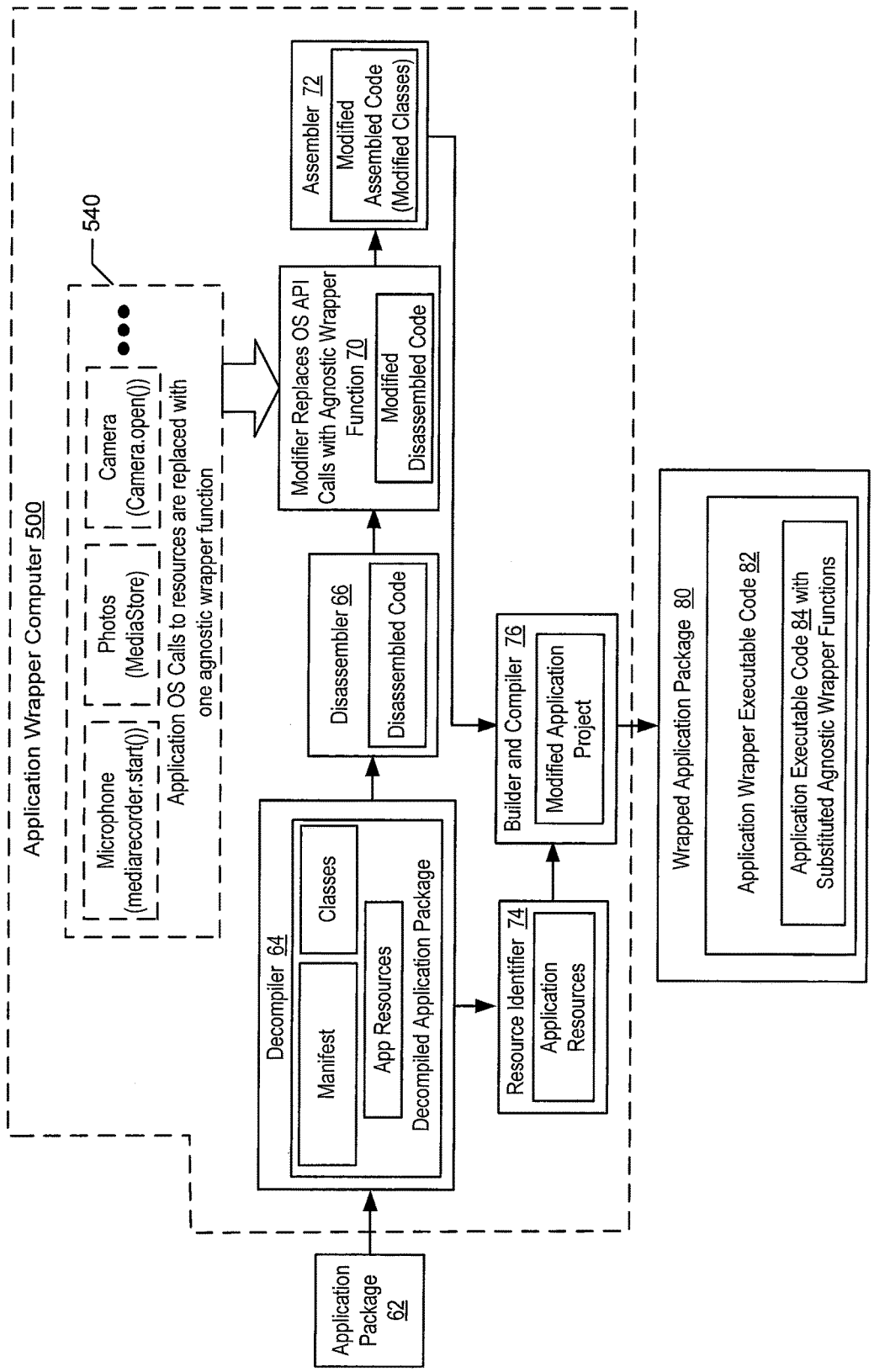
FIG. 5 is a block diagram illustrating operations and data flows of an application wrapper computer to generate a wrapped application package in accordance with some embodiments of the present disclosure.

FIG. 5 is a block diagram illustrating operations and data flows of an application wrapper computer 500 to generate a wrapped application package 80. Referring to FIG. 5, executable code of an application package 62 is decompiled using a decompiler 54, such as apktool, to provide a decompiled application package. The decompiled application package may include an XML format manifest, a set of application resources, and classes. The classes file may be a binary source code file, which, for a Java application written for the Android operating system, can be Java classes compiled to Dalvik VM bytecode in .dex format. The decompiled application package is disassembled, e.g., by a disassembler 66, to provide disassembled code. For example, binary source code of the application is extracted from the decompiled application package 64, and a disassembler 66 for .dex files, such as smali, disassembles the binary source code to .smali format to produce disassembled code, e.g., disassembled source code. Smali files are an assembly format that is native to dex or Dalvik bytecode.

A modifier component 70 replaces each instance of operating system (OS) application programming interface (API) calls to resources of a mobile device, which are located at different locations in the disassembled code, with an agnostic wrapper function. The disassembled code with the substituted agnostic wrapper function forms modified disassembled code, which may be in the .smali format. Block 540 illustrates example OS API calls at different locations in the disassembled code. The example OS API calls 540 include an OS API call to a microphone resource (e.g., mediarecorder.start( )) of a mobile device, another OS API call to a photo repository resource (e.g., MediaStore) of the mobile device, another OS API call to a camera resource (e.g., camera.open( )) of the mobile device, etc. Each of these unique resource dependent OS API calls to the microphone resource, the photo repository resource, the camera resource, etc. are replaced with a call to the same agnostic wrapper function but having different aguments. The arguments of the agnostic wrapper function are defined by the modifier 70 based on the particular one of the unique resource dependent OS API calls that is being replaced.

Figure 6:
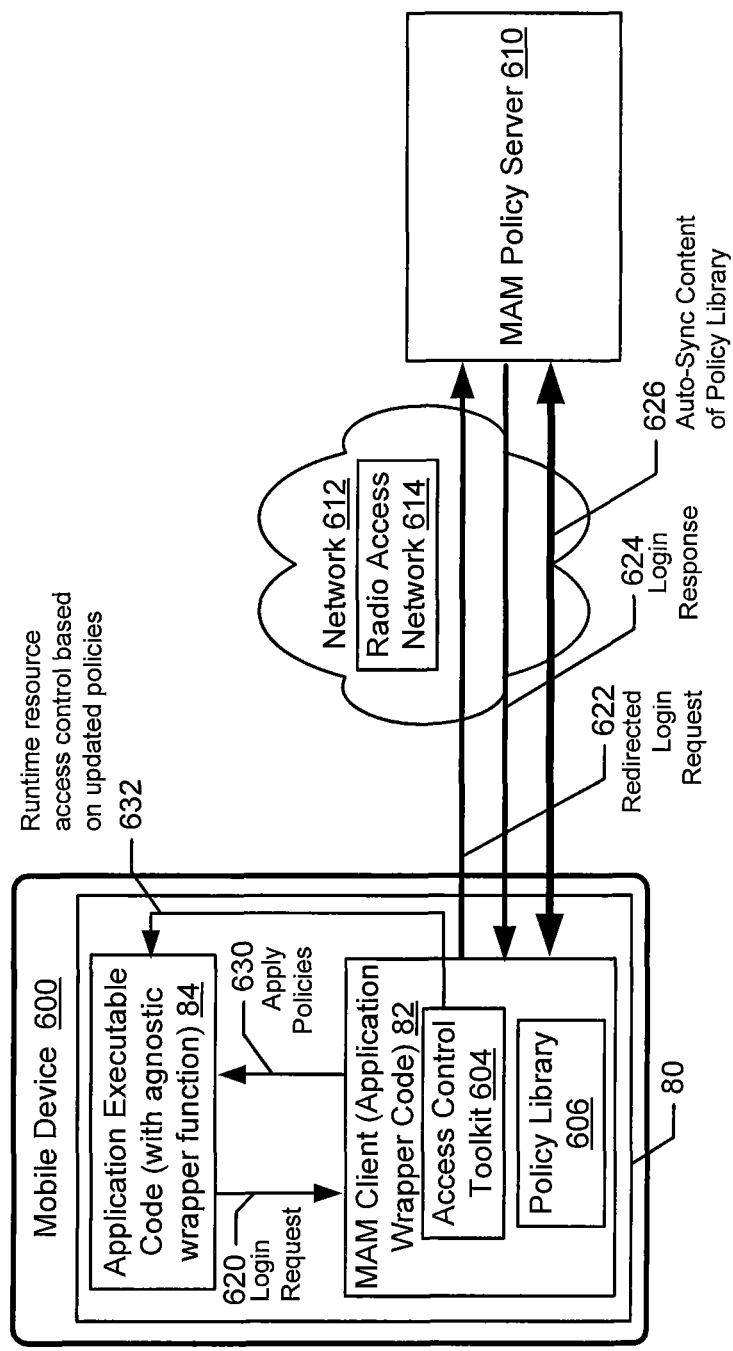
FIG. 6 is a mobile device and MAM policy server illustrating operations and data flows to provide an updated policy library from the policy server at mobile device runtime of an application package to control its access to mobile device resources according to some embodiments of the present disclosure.
Figure 7:
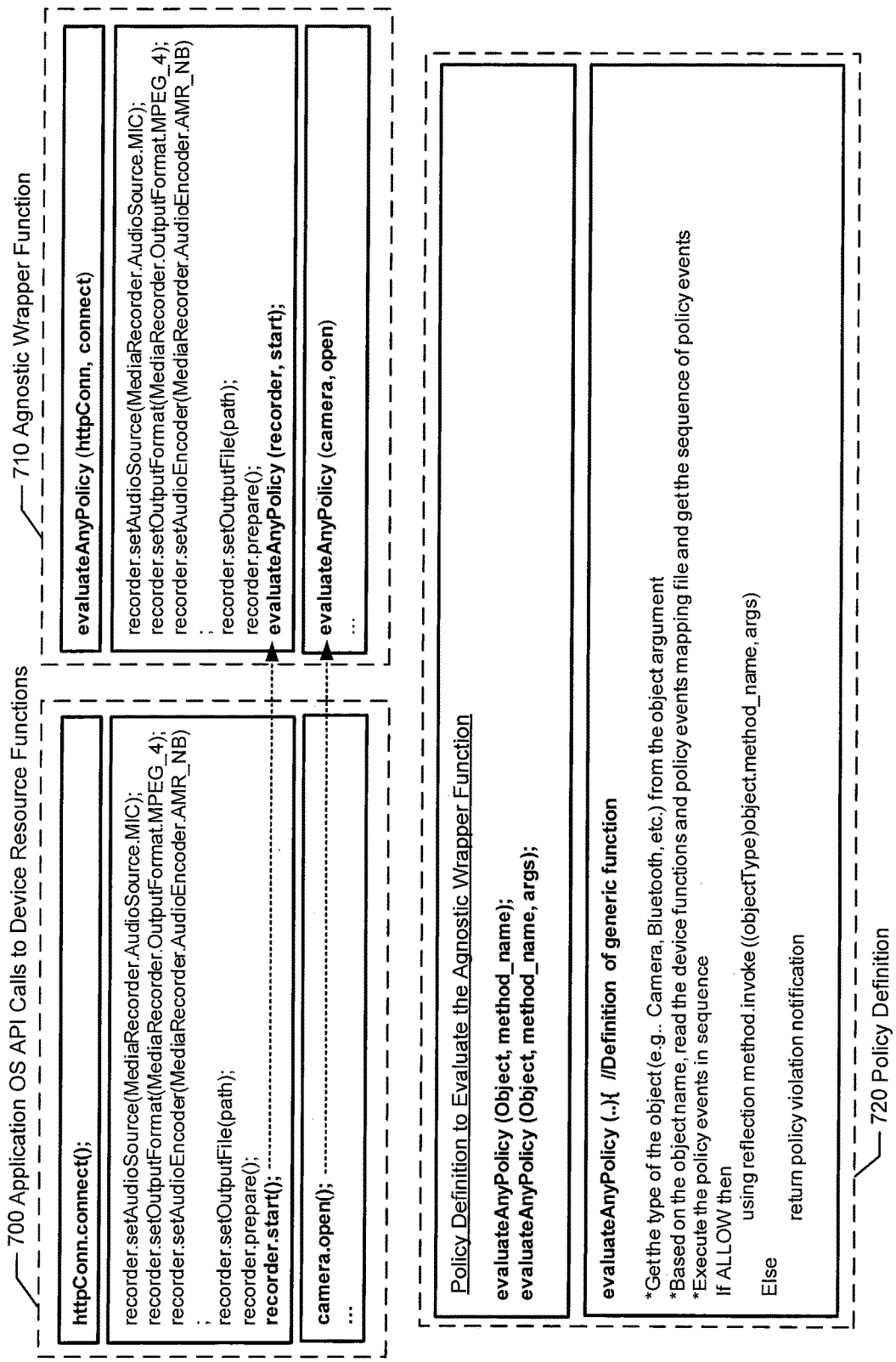
FIG. 7 illustrates application operating system application programming interface calls by an application to mobile device resource functions, an agnostic wrapper function that has been inserted into the application, and a policy definition that evaluates the agnostic wrapper function upon its execution by a mobile device in accordance with some embodiments of the present disclosure.

FIG. 7 illustrates example application OS API calls 700 by an application to mobile device resource functions, an agnostic wrapper function 710 that has been inserted into the application by the modifier 70, and a policy definition 720 that evaluates the agnostic wrapper function upon its execution by a mobile device in accordance with some embodiments of the present disclosure. Referring to FIG. 7, in the disassembled code of the application, the modifier 70 identifies an audio recorder resource that is called by one of the OS API calls 700. The application call involves the following defined functions: "recoder.setAudioSource" function to define the microphone "MIC" resource of the mobile device as being the audio source; "recorder.setOutputFormat" function to define the audio output format as "MPEG_4"; "recorder.setAudioEncoder" function to define the "AMR_NB" encoder to be used to encode the audio; and "recoder.setOutputFile" to define the file pathway where the encoded audio is to be stored. The resource dependent OS API "recoder.start( )" is replaced by the agnostic wrapper function 710 "evalutateAnyPolicy" with arguments "recorder" and "start" which are to be evaluated by a policy among a plurality of policies in a policy definition library which has been fetched at run-time by the mobile device, as will be explained below with regard to FIG. 6 and FIGS. 9 and 10.

In a similar manner, another resource dependent OS API "camera.open( )" is replaced by the agnostic wrapper function 710 "evalutateAnyPolicy" with arguments "camera" and "open" which are to be evaluated by another policy among a plurality of policies in the policy definition library which has been fetched at run-time by the mobile device, as will be explained below with regard to FIG. 6 and FIGS. 9 and 10. Accordingly, two different resource dependent OS API calls located at different locations within the disassembled code of the application have each been replaced with the same agnostic wrapper function "evaluateAnyPolicy" to trigger application wrapper executable code to evaluate each instance of the agnostic wrapper function based on the corresponding policies in the policy definition library.

The modified disassembled code is then assembled by an assembler 72, such as baksmali, to provide modified assembled code, which may include modified classes in the .dex format. Application resources can be extracted from the decompiled application package by a resource identifier 74. A builder and complier 76 combines the modified assembled code together with application resources and files of a modified application project, such as a software development kit (SDK) library, to form a wrapped application package 80 that can be ready to be installed on a mobile device. For an Android application, the wrapped application package 80 can include an .apk file.

In accordance with various embodiments of the present disclosure, the wrapped application package 80 contains application executable code 84 and application wrapper executable code 82. The application executable code 84 includes the agnostic wrapper function that has been substituted for each of the resource dependent OS API calls at the spaced apart locations in the original application. Each instance of the agnostic wrapper function contains arguments that are defined by the modifier component 70 based on the replaced resource dependent OS API call, such as illustrated by the illustrated instances of the agnostic wrapper function 710 of FIG. 7.

The application wrapper executable code 82 is called by each execution, by a host mobile device, of the agnostic wrapper function residing at each of the plurality of locations in the application executable code 84. The application wrapper executable code 82 is further configured to respond to occurrence of a defined event associated with the wrapped application package 80, by fetching a policy definition library from a policy server through a data network. The policy definition library contains policies defining resources of the mobile device that the application package is permitted to access. Responsive to execution of the agnostic wrapper function at any of the plurality of locations in the application executable code 84 by the mobile device, the application wrapper executable code is called and executed to control whether access by the application executable code 84 is granted to resources of the mobile device based on the policies contained in the policy definition library.

Various embodiments of the present disclosure arise from the present realization of limitations associated with prior approaches where a policy definition library is injected into a wrapped application package by an application wrapper computer during compilation by a compiler. A consequence of that approach is that the application must be rewrapped responsive to any changes in the policy definition library.

For example, assuming 10 applications have been wrapped with a policy definition library, called "Secure Toolkit v1.0." When the policy definition library is updated to "Secure Toolkit v2.0" to include a minor change to a policy controlling printing of log files by wrapped applications, all 10 of the applications must be rewrapped in order to incorporate the updated "Secure Toolkit v2.0". The process for wrapping each of the 10 applications can take significant operator time and computing resources in order to write wrapper functions specific to each resource function called by the application. Moreover, the newly rewrapped application must then be distributed to all host mobile devices and successfully installed thereon to provide consistent implementation of the policies in the updated policy definition library across all mobile devices using the affected wrapped applications. Repetition of the wrapping responsive in order to incorporate each update in policy definition library can be unreasonably expensive and introduce unacceptable delay before its implementation across all of the mobile devices.

Various embodiments of the present disclosure may overcome one or more of these limitations by providing a mobile device that fetches a policy definition library at run-time of a wrapped application from a policy server. FIG. 6 illustrates a mobile device 600 and a Mobile Application Management (MAM) policy server 610 and further illustrates operations and data flows to provide an updated policy library from the policy server 610 at mobile device 600 runtime of an application package to control its access to resources of the mobile device 600 according to some embodiments of the present disclosure. Although various embodiments are described in the context of MAM, the policy server is not limited thereto.

Referring to FIG. 6, the mobile device 600 has installed a wrapped application package 80 containing a MAM client, configured as application wrapper executable code 82, that contains a resource access control toolkit 604 that controls access by the application executable code 84 to resources of the mobile device 600 based on policies defined in a policy library 606. FIG. 9 is a flowchart of operations by the mobile device 600 in accordance with some embodiments of the present disclosure.

Figure 9:
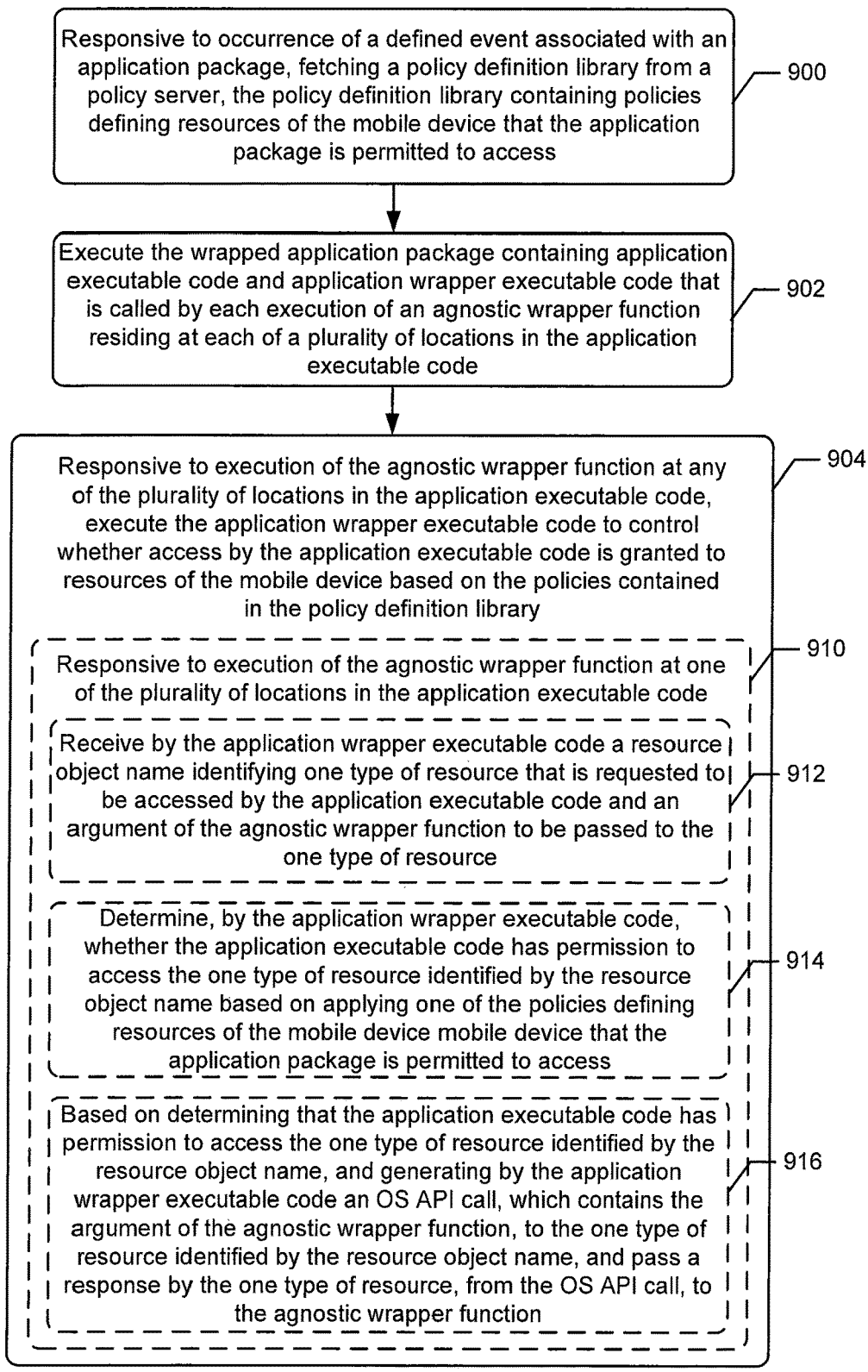
FIG. 9 is a flowchart of operations by a mobile device in accordance with some embodiments of the present disclosure.

Referring to FIGS. 6 and 9, the MAM client 82 responds to occurrence of a defined event associated with the application package (e.g., application executable code 84), by fetching (block 900) a policy definition library from the MAM policy server 610 through a data network 612. The data network 612 may include a radio access network 614 and a wireline network. The MAM client 82 includes and/or updates content of the policy library 606 based on policies of the fetched policy definition library. The policies define resources of the mobile device 600 that the application executable code 84 is permitted to access.

In accordance with an embodiment illustrated in FIG. 6, the MAM client 82 fetches the policy definition library from the MAM policy server 610 by operations that include communicating a request message directed through the data network 612 to the MAM policy server 610, where the request message containing an identifier of the application package and which requests delivery of one of a plurality of policy definition libraries accessible through the MAM policy server 610 that is associated with the identifier of the application package 80 (e.g., identifier of the application executable code 84), and receiving the one of the plurality of policy definition libraries from the MAM policy server 610.

In a further embodiment, the operations may further include identifying the occurrence of the defined event associated with the application package responsive to receiving login information from the application executable code 84, and communicating a login request message through the data network 612 to the MAM policy server 610. The login request message may be communicated as a redirected login request message 622 containing the login information. The MAM client 82 receives a login response message 624 from the MAM policy server 610, and performs the communicating the request message directed through the data network 612 to the MAM policy server 610 responsive to the login response message indicating an authorization for the MAM client 82 (e.g., application wrapper executable code) to request the delivery of one of the plurality of policy definition libraries accessible through the MAM policy server 610.

In a further embodiment, communication of the request message directed through the data network 612 to the MAM policy server 610, can include synchronizing (operation 626) content of the policy definition library 606 residing in a memory of the mobile device 600 to correspond to content of the one of the plurality of policy definition libraries accessible through the MAM policy server 610 that is associated with the identifier. Accordingly, responsive to a login request from the application executable code 84, the MAM client 82 can communicate with the MAM policy server 610 to confirm that a user of the mobile device 600 and/or the mobile device 600 is authorized to obtain a policy library and, if so, communicate with the MAM policy server 610 to synchronize content of the policy library 606 residing in local memory of the mobile device 600 to content of the one of the plurality of policy definition libraries accessible through the MAM policy server 610 that is associated with the identifier for the application executable code 84.

In this manner, at run-time of the application the MAM client 82 can update the policy library 606 through communications with the MAM policy server 610 so that the then-current policies defined in the MAM policy server 610 are used to control access by the application to resources of the mobile device 600. These operations may avoid any need to regenerate a wrapped application package through rewrapping the application executable code process, since policy changes occurring in the MAM policy server 610 are dynamically distributed to each mobile device at run-time of the application executable code 84 according to occurrence of a defined event, such as an attempt to login as explained above.

In a further embodiment, the MAM client 82 identifies occurrence of the defined event which triggers fetching of the policy definition library from the MAM policy server 610, responsive to execution of the agnostic wrapper function at one of the plurality of locations in the application executable code 84. Thus, execution of one of the agnostic wrapper functions causes the MAM client 82 to fetch the policy definition library from the MAM policy server 610. Responsive to the execution of the agnostic wrapper function, the MAM client 82 communicates the request message directed through the data network 612 to the MAM policy server 610, where the request message contains the identifier of the application package (e.g., application executable code 84) and requests delivery of one of a plurality of policy definition libraries accessible through the MAM policy server 610 that is associated with the identifier of the application package. The MAM client 82 then receives the one of the plurality of policy definition libraries from the MAM policy server 610, and synchronizes content of the policy definition library 606 residing in a memory of the mobile device 600 to correspond to content of the one of the plurality of policy definition libraries.

After including and/or updating the policy library 606 using the policy definition library fetched from the MAM policy server 610, the MAM client 82 is ready to use the access control toolkit 604 to apply the policies from the policy library 606 to control (e.g., selectively grant or deny) attempts by the application executable code 84 to access resources of the mobile device 600.

With further reference to FIGS. 6 and 9, the mobile device 600 executes (block 902) the wrapped application package containing the application executable code 84 and the MAM client 82 (e.g., application wrapper executable code) that is called by each execution of the agnostic wrapper function residing at each of a plurality of locations in the application executable code 84. Execution of the agnostic wrapper function at any of the plurality of locations in the application executable code 84 triggers execution (block 904) of the MAM client 82 (e.g., application wrapper executable code) to control whether access by the application executable code 84 is granted to resources of the mobile device 600 based on the policies contained in the policy definition library 606.

In one embodiment, execution of the MAM client 82 (e.g., application wrapper executable code) to control whether access by the application executable code 84 is granted to resources of the mobile device 600 based on the policies contained in the policy definition library 606 can include the further operations of block 910 of FIG. 9. Responsive (block 910) to execution of the agnostic wrapper function at one of the plurality of locations in the application executable code 84, the MAM client 82 (e.g., application wrapper executable code) receives (block 912) a resource object name identifying one type of resource that is requested to be accessed by the application executable code 84 and an argument of the agnostic wrapper function to be passed to the one type of resource. The MAM client 82 (e.g., application wrapper executable code) determines (block 914) whether the application executable code 84 has permission to access the one type of resource identified by the resource object name based on applying one of the policies defining resources of the mobile device that the application package is permitted to access. Based on the MAM client 82 (e.g., application wrapper executable code) determining that the application executable code 84 has permission to access the one type of resource identified by the resource object name, the MAM client 82 generates (block 916) an OS API call, which contains the argument of the agnostic wrapper function, to the one type of resource identified by the resource object name.

Thus, the resource specific OS API call contained in the original application executable code was replaced with an agnostic wrapper function which passes arguments from the modified application executable code to the MAM client 82. The MAM client 82 then applies a policy from the policy library 606 to determine when the agnostic wrapper function executed in the modified application executable code is permitted to have access to the requested resource. When such access is permitted, the MAM client 82 generates a resource specific OS API call using the arguments it received from the agnostic wrapper function, and performs the OS API call to that resource.

Moreover, based on determining (block 914) that the application executable code 84 has permission to access the one type of resource identified by the resource object name, the MAM client 82 (e.g., application wrapper executable code) passes (block 916) a response by the one type of resource, from the OS API call, to the agnostic wrapper function at the location within the application executable code 84.

The operations of Blocks 904-916 are repeated for each execution of the agnostic wrapper function at any of the plurality of locations in the application executable code 84. For example, responsive to execution of the agnostic wrapper function at another one of the plurality of locations in the application executable code 84, the MAM client 82 (e.g., application wrapper executable code) receives another resource object name identifying another resource that is requested to be accessed by the application executable code and an argument of the another agnostic wrapper function to be passed to the another type of resource. The MAM client 82 then determines whether the application executable code has permission to access the another resource identified by the another resource object name based on applying another one of the policies defining resources of the mobile device 600 that the application package is permitted to access. Based on determining that the application executable code 84 has permission to access the another resource identified by the another resource object name, the MAM client 82 generates another OS API call, which contains the argument of the another agnostic wrapper function, to the another resource identified by the another resource object name.

Moreover, based on determining that the application executable code 84 has permission to access the another type of resource identified by the another resource object name, the MAM client 82 (e.g., application wrapper executable code) passes a response by the another type of resource, from the another OS API call, to the agnostic wrapper function at the another location within the application executable code 84.

In the example embodiment, the one type of resource identified by the resource object name and the another type of resource identified by the another resource object name are two different ones of the following resources of the mobile device 600: a camera resource; a source recorder resource; a location services resource; and a contact information repository resource. Other types of resources of the mobile device 600 who's access attempts by the application executable code, via the agnostic wrapper functions, can be controlled by the MAM client (e.g., application wrapper executable code) can include, but are not limited to: an external storage device interface (e.g., USB, Lightning, etc.), cellular communication interface, WiFi communication interface, Bluetooth communication interface, location services, Internet services, encryption, etc.

Figure 8:
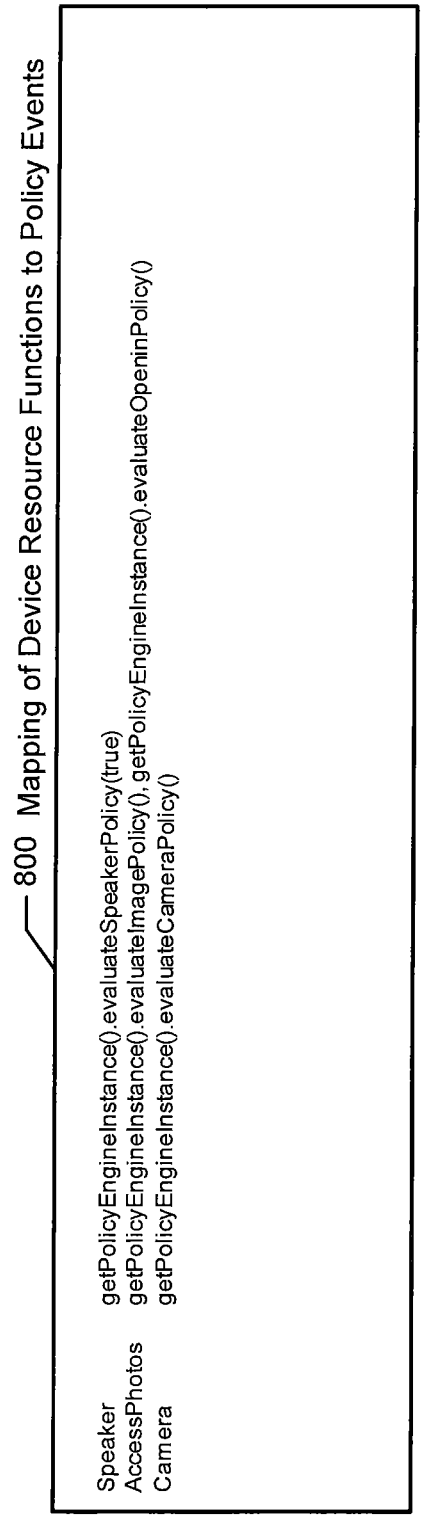
FIG. 8 illustrates an example program code used to map mobile device resource functions to policy events in accordance with some embodiments of the present disclosure.

Referring to the example policy definition 720 of FIG. 7, evaluation of a policy definition can be initiated based on execution of a function "evaluateAnyPolicy" provided by the agnostic wrapper function 710 which contains an object identifies the resource and which may further include a method name and one or more arguments. For example, execution of the agnostic wrapper function "evaluateAny-Policy" provides the type of resource (object), such as camera, Bluetooth, etc., to be access. The type of resource (object) is used to read a mapping file which maps device resource functions to policy events. An example mapping file 800 is shown in FIG. 8 which maps a "speaker" resource to a policy event "getPolicyEngineInstance( ).evaluate-SpeakerPolicy(true)", maps an "AccessPhotos" resource to another policy event "getPolicyEngineInstance( ).evaluateImagePolicy.getPolicyEngineInstance( ).evaluateOpeninPolicy( )", and maps a "Camera" resource to still another policy event "getPolicyEngineInstance( ).evaluateCameraPolicy( )." Policy events, which are defined by the policy identified through the mapping file 800 as corresponding to the device resource identified by the object, are executed. The policy events may, for example, restrict access to the "Camera" to only certain users of the mobile device 600, restrict access to the "Camera" to only certain defined time ranges and/or day of week ranges, prevent access to the "Camera" within certain defined geographic regions (e.g., prohibit use within 1 mile of a defined enterprise facility), etc.

When execution of the policy events results in a determination that the access is allowed, the MAM client 82 generates the OS API call to the resource passing along any necessary arguments received through the agnostic wrapper function, such as by using a define reflection method (operation). Otherwise, when execution of the policy events results in a determination that the access is not allowed, the MAM client 82 prevents generation of an OS API call to the resource and may return a policy violation notification as a returned object to the agnostic wrapper function within the application executable code 84.

Figure 10:
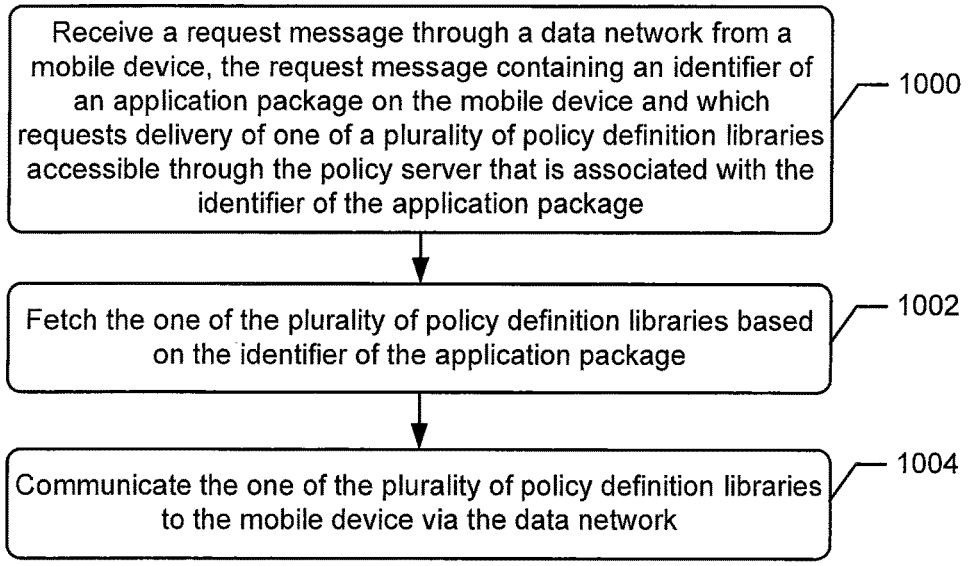
FIG. 10 is a flowchart of operations by a policy server in accordance with some embodiments of the present disclosure.

FIG. 10 is a flowchart of operations by a policy server, such as the MAM policy server 610 in accordance with some embodiments of the present disclosure. These operations may correspond to various of the operations described above for the MAM policy server in connection with FIGS. 6-9. Referring to FIG. 10, the policy server receives (block 1000) a request message through a data network (e.g., network 612) from a mobile device (e.g., device 600), the request message contains an identifier of an application package on the mobile device and which requests delivery of one of a plurality of policy definition libraries accessible through the policy server that is associated with the identifier of the application package. The policy server fetches (block 1002) the one of the plurality of policy definition libraries based on the identifier of the application package. The policy server then communicates (block 1004) the one of the plurality of policy definition libraries to the mobile device via the data network.

The policy server may, prior to receiving the request message, receive a login request message through the data network from the mobile device. The login request message contains login information identifying a user of the mobile device. The policy server then determines whether the user is authorized to request delivery of the policy definition library, and communicates a login response message through the data network to the mobile device. The communication of the one of the plurality of policy definition libraries to the mobile device via the data network may, in some embodiments, only be performed based on the application package being determined to be authorized to request delivery of the one of the plurality of policy definition libraries.

Communication of the one of the plurality of policy definition libraries to the mobile device may include synchronizing content of a policy definition library residing in a memory of the mobile device to correspond to content of the one of the plurality of policy definition libraries accessible through the policy server.

Figure 11:
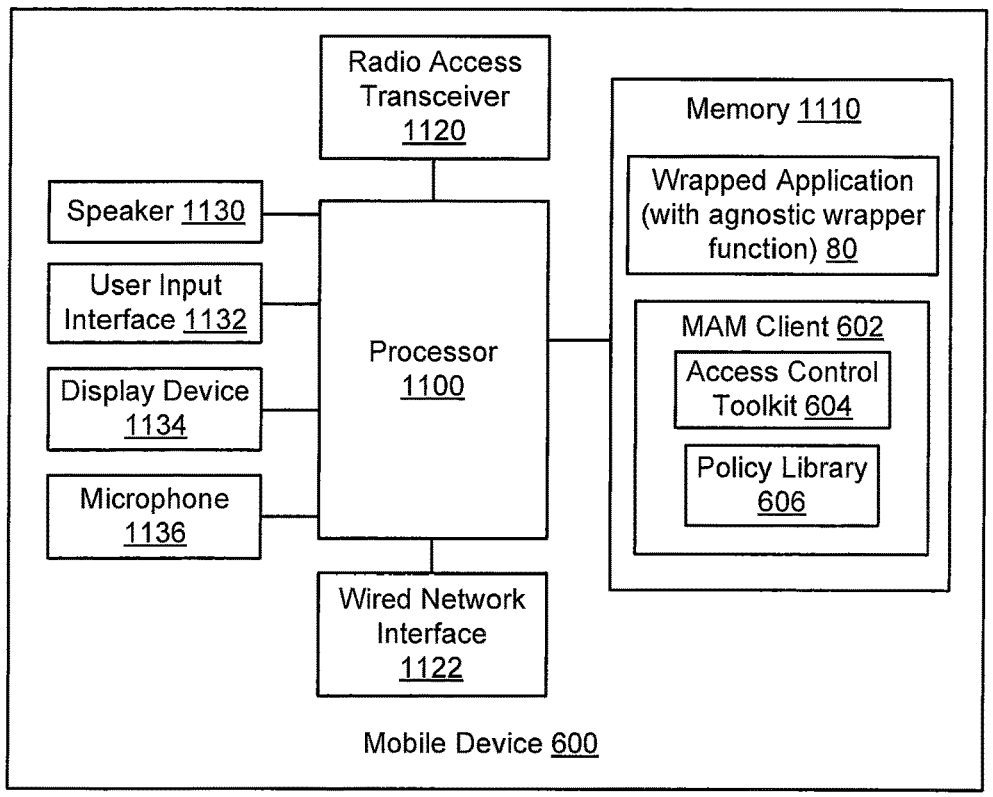
FIG. 11 is a block diagram of a mobile device configured according to some embodiments.

FIG. 11 is a block diagram of a mobile device 600 configured according to some embodiments of the present disclosure. Referring to FIG. 11, the mobile device 600 includes a processor 1100, a memory 1110, and a network interface which may include a radio access transceiver 1120 and/or a wired network interface 1122 (e.g., Ethernet interface). The radio access transceiver 1120 can include, but is not limited to, a LTE or other cellular transceiver, WLAN transceiver (IEEE 802.11), WiMax transceiver, or other radio communication transceiver configured to communicate with the MAM policy server 610 via a radio access network.

The processor 1100 may include one or more data processing circuits, such as a general purpose and/or special purpose processor, such as a microprocessor and/or digital signal processor. The processor 1100 is configured to execute computer program code in the memory 1110, described below as a non-transitory computer readable medium, to perform at least some of the operations described herein as being performed by a user terminal. The computer program code may include the wrapped application package 80 and the MAM client 602, which can include the access control toolkit 604 and the policy library 606. The mobile device 600 may further include a speaker 1130, user input interface 1132 (e.g., touch screen, keyboard, keypad, etc.), a display device 1134, and a microphone 1136.

Figure 12:
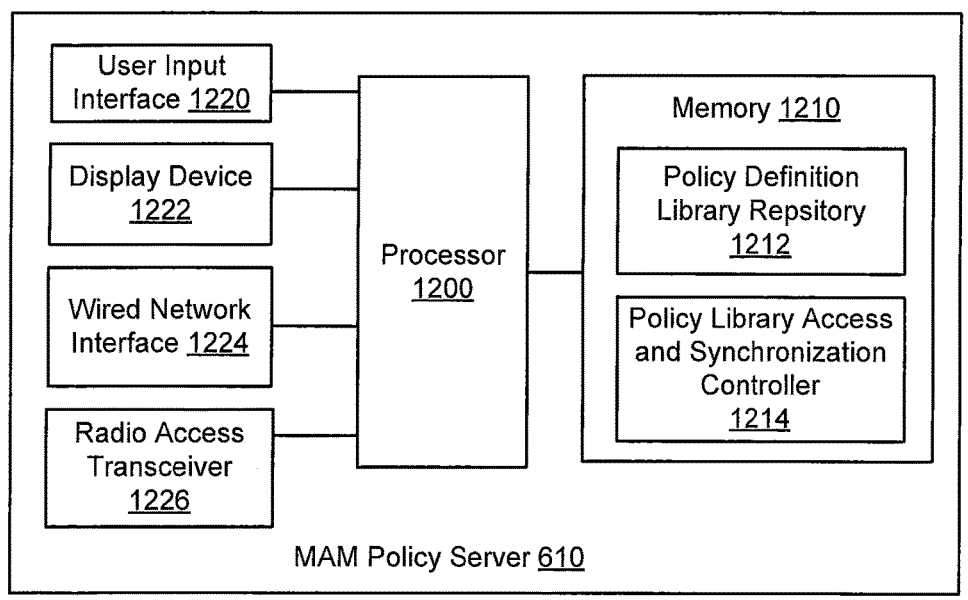
FIG. 12 is a block diagram of a MAM policy server configured according to some embodiments.

FIG. 12 is a block diagram of a MAM policy server 610 configured according to some embodiments of the present disclosure. The MAM policy server 610 includes a processor 1200, a memory 1210, and a network interface which may include a radio access transceiver 1226 and/or a wired network interface 1224 (e.g., Ethernet interface). The radio access transceiver 1226 can include, but is not limited to, a LTE or other cellular transceiver, WLAN transceiver (IEEE 802.11), WiMax transceiver, or other radio communication transceiver configured to communicate with the mobile device 600 via a radio access network.

The processor 1200 may include one or more data processing circuits, such as a general purpose and/or special purpose processor (e.g., microprocessor and/or digital signal processor) that may be collocated or distributed across one or more networks. The processor 1200 is configured to execute computer program code in the memory 1210, described below as a non-transitory computer readable medium, to perform at least some of the operations described herein as being performed by an application analysis computer. The computer program code may include a policy definition library repository 1212 and a policy library access and synchronization controller 1214 based on one or more of the embodiments disclosed herein. The MAM policy server 610 may further include a user input interface 1220 (e.g., touch screen, keyboard, keypad, etc.) and a display device 1222.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination, of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
performing operations as follows on a processor of a mobile device:
responsive to occurrence of a defined event associated with an application package, fetching a policy definition library from a policy server through a data network without fetching other policy definition libraries from the policy server, the policy definition library containing policies defining resources of the mobile device that the application package is permitted to access;
executing a wrapped application package containing application executable code and application wrapper executable code that is called by each execution of an agnostic wrapper function residing at each of a plurality of locations in the application executable code, wherein the agnostic wrapper function operates independent of the application executable code;
responsive to execution of the agnostic wrapper function at one of the plurality of locations in the application executable code and further responsive to determining, based on applying one of the policies in the policy definition library, that the application executable code has permission to access one type of resource identified by a resource object name, executing the application wrapper executable code to control whether access by the application executable code is granted to resources of the mobile device based on the policies contained in the policy definition library by generating an operating system (OS) application programming interface (API) call, which contains an argument of an agnostic wrapper function to be passed to the one type of resource, to the one type of resource, wherein the resource object name and the argument of the agnostic wrapper function are received by the application wrapper executable code;
responsive to determining that the application executable code does not have permission to access the one type of resource identified by the resource object name, executing the application wrapper executable code to block generation of the OS API call to the one type of resource identified by the resource object name; and
responsive to determining that the application executable code has permission to access the one type of resource identified by the resource object name, executing the application wrapper executable code to pass a response by the one type of resource, from the OS API call, to the agnostic wrapper function.

2. The method of claim 1, wherein executing the application wrapper executable code to control whether access by the application executable code is granted to resources of the mobile device based on the policies contained in the policy definition library, further comprises:
responsive to execution of the agnostic wrapper function at another one of the plurality of locations in the application executable code,
receiving by the application wrapper executable code another resource object name identifying another resource that is requested to be accessed by the application executable code and an argument of the another agnostic wrapper function to be passed to the another type of resource,
determining, by the application wrapper executable code, whether the application executable code has permission to access the another resource identified by the another resource object name based on applying another one of the policies defining resources of the mobile device that the application package is permitted to access, and
responsive to determining that the application executable code has permission to access the another resource identified by the another resource object name, generating by the application wrapper executable code another OS API call, which contains the argument of the another agnostic wrapper function, to the another resource identified by the another resource object name.

3. The method of claim 2, wherein the operations further comprise:
responsive to determining that the application executable code has permission to access the another type of resource identified by the another resource object name, executing the application wrapper executable code to pass a response by the another type of resource, from the another OS API call, to the another agnostic wrapper function.

4. The method of claim 3, wherein the one type of resource identified by the resource object name and the another type of resource identified by the another resource object name are two different ones of the following resources of the mobile device: a camera resource; a source recorder resource; a location services resource; and a contact information repository resource.

5. The method of claim 1, wherein the fetching a policy definition library from a policy server through a data network without fetching other policy definition libraries from the policy server, the policy definition library containing policies defining resources of the mobile device that the application package is permitted to access, comprises:
communicating a request message directed through the data network to the policy server, the request message containing an identifier of the application package and which requests delivery of one of a plurality of policy definition libraries accessible through the policy server that is associated with the identifier of the application package; and receiving the one of the plurality of policy definition libraries from the policy server.

6. The method of claim 5, wherein the operations further comprise:

identifying the occurrence of the defined event associated with the application package responsive to receiving login information from the application executable code;

communicating a login request message through the data network to the policy server, the login request message containing the login information;

receiving a login response message from the policy server; and performing the communicating the request message directed through the data network to the policy server responsive to the login response message indicating an authorization for the application wrapper executable code to request the delivery of one of the plurality of policy definition libraries accessible through the policy server.

7. The method of claim 5, wherein the communicating a request message directed through the data network to the policy server, comprises:

synchronizing content of a policy definition library residing in a memory of the mobile device to correspond to content of the one of the plurality of policy definition libraries accessible through the policy server that is associated with the identifier.

8. The method of claim 5, wherein the responsive to occurrence of a defined event associated with an application package, fetching a policy definition library from a policy server through a data network without fetching other policy definition libraries from the policy server, the policy definition library containing policies defining resources of the mobile device that the application package is permitted to access, comprises:

identifying the occurrence of the defined event associated with the application package responsive to execution of the agnostic wrapper function at one of the plurality of locations in the application executable code;

responsive to the execution of the agnostic wrapper function, communicating the request message directed through the data network to the policy server, the request message containing the identifier of the application package and which requests delivery of one of a plurality of policy definition libraries accessible through the policy server that is associated with the identifier of the application package, receiving the one of the plurality of policy definition libraries from the policy server, and synchronizing content of a policy definition library residing in a memory of the mobile device to correspond to content of the one of the plurality of policy definition libraries.

9. A mobile device, comprising:

a processor; and a memory coupled to the processor and storing computer readable program code that when executed by the processor causes the processor to perform operations comprising:

responsive to occurrence of a defined event associated with an application package, fetching a policy definition library from a policy server through a data network without fetching other policy definition libraries from the policy server, the policy definition library containing policies defining resources of the mobile device that the application package is permitted to access;

executing a wrapped application package containing application executable code and application wrapper executable code that is called by each execution of an agnostic wrapper function residing at each of a plurality of locations in the application executable code, wherein the agnostic wrapper function operates independent of the application executable code;

responsive to execution of the agnostic wrapper function at any of the plurality of locations in the application executable code and further responsive to determining, based on applying one of the policies in the policy definition library, that the application executable code has permission to access one type of resource identified by a resource object name, executing the application wrapper executable code to control whether access by the application executable code is granted to resources of the mobile device based on the policies contained in the policy definition library by generating an operating system (OS) application programming interface (API) call, which contains an argument of an agnostic wrapper function to be passed to the one type of resource, to the one type of resource, wherein the resource object name and the argument of the agnostic wrapper function are received by the application wrapper executable code;

responsive to determining that the application executable code has permission to access the one type of resource identified by the resource object name, executing the application wrapper executable code to pass a response by the one type of resource, from the OS API call, to the agnostic wrapper function; and responsive to determining that the application executable code does not have permission to access the one type of resource identified by the resource object name, executing the application wrapper executable code to block generation of the OS API call to the one type of resource identified by the resource object name.

10. The mobile device of claim 9, wherein executing the application wrapper executable code to control whether access by the application executable code is granted to resources of the mobile device based on the policies contained in the policy definition library, further comprises:

responsive to execution of the agnostic wrapper function at another one of the plurality of locations in the application executable code, receiving by the application wrapper executable code another resource object name identifying another resource that is requested to be accessed by the application executable code and an argument of the another agnostic wrapper function to be passed to the another type of resource, determining, by the application wrapper executable code, whether the application executable code has permission to access the another resource identified by the another resource object name based on applying another one of the policies defining resources of the mobile device that the application package is permitted to access, and responsive to determining that the application executable code has permission to access the another resource identified by the another resource object name, generating by the application wrapper executable code another OS API call, which contains the argument of the another agnostic wrapper function, to the another resource identified by the another resource object name.

11. The mobile device of claim 10, wherein the operations further comprise:
responsive to determining that the application executable code has permission to access the another type of resource identified by the another resource object name, executing the application wrapper executable code to pass a response by the another type of resource, from the another OS API call, to the another agnostic wrapper function.

12. The mobile device of claim 11, wherein the one type of resource identified by the resource object name and the another type of resource identified by the another resource object name are two different ones of the following resources of the mobile device: a camera resource; a source recorder resource; a location services resource; and a contacts information repository resource.

13. The mobile device of claim 9, wherein the operations further comprise:
identifying the occurrence of the defined event associated with the application package responsive to receiving login information from the application executable code;
communicating a login request message through the data network to the policy server, the login request message containing the login information; and
receiving a login response message from the policy server,
wherein the fetching a policy definition library from a policy server through a data network without fetching other policy definition libraries from the policy server, the policy definition library containing policies defining resources of the mobile device that the application package is permitted to access, comprises:
responsive to the login response message indicating an authorization for the application wrapper executable code to request the delivery of one of the plurality of policy definition libraries accessible through the policy server, communicating a request message directed through the data network to the policy server, the request message containing an identifier of the application package and which requests delivery of one of a plurality of policy definition libraries accessible through the policy server that is associated with the identifier of the application package; and
receiving the one of the plurality of policy definition libraries from the policy server.

* * * * *